(12) United States Patent
Varriano-Marston

(10) Patent No.: US 11,247,428 B2
(45) Date of Patent: Feb. 15, 2022

(54) APPARATUS AND METHOD FOR PRODUCING MICROPERFORATED PATCHES AND LABELS APPLICABLE TO MODIFIED ATMOSPHERE PACKAGING

(71) Applicant: MarstonMAP, LLC, Windham, NH (US)

(72) Inventor: Elizabeth Varriano-Marston, Windham, NH (US)

(73) Assignee: MarstonMAP, LLC, Windham, NH (US)

( * ) Notice: Subject to any disclaimer, the term of this patent is extended or adjusted under 35 U.S.C. 154(b) by 101 days.

(21) Appl. No.: 16/324,990

(22) PCT Filed: Oct. 24, 2017

(86) PCT No.: PCT/US2017/058091
§ 371 (c)(1),
(2) Date: Feb. 12, 2019

(87) PCT Pub. No.: WO2018/085080
PCT Pub. Date: May 11, 2018

(65) Prior Publication Data
US 2019/0224936 A1 Jul. 25, 2019

Related U.S. Application Data

(60) Provisional application No. 62/418,425, filed on Nov. 7, 2016.

(51) Int. Cl.
*B31D 1/02* (2006.01)
*B31D 1/00* (2017.01)
(Continued)

(52) U.S. Cl.
CPC .......... *B31D 1/026* (2013.01); *B23K 26/0676* (2013.01); *B31B 70/14* (2017.08); *B31D 1/0062* (2013.01); *B31D 1/021* (2013.01)

(58) Field of Classification Search
CPC ...... B31D 1/026; B31D 1/0062; B31D 1/021; B31B 70/14; B23K 26/0062; B23K 26/0676
(Continued)

(56) References Cited

U.S. PATENT DOCUMENTS 4,118,619 A * 10/1978 McArthur ............ B23K 26/067
219/121.7
4,265,254 A * 5/1981 Koch ..................... A24C 5/606
131/281
(Continued)

FOREIGN PATENT DOCUMENTS

JP 3262512 B2 3/2002

OTHER PUBLICATIONS

Extended European Search Report for Application No. 17867107.9 dated Feb. 6, 2020, 9 pages.
(Continued)

*Primary Examiner* — Chelsea E Stinson
*Assistant Examiner* — Scott A Howell
(74) *Attorney, Agent, or Firm* — Maine Cernota & Rardin

(57) ABSTRACT

An apparatus and method for producing microperforated patches for MAP includes drilling or punching microperforations through continuously advancing label stock. Holes can be drilled by at least one microperforating laser traversed across the label stock as it advances, a laser beam deflected or split using a servo-driven galvanometer, beam splitters, or a plurality of mirrors, or by drills mounted into a rotating die cylinder across which the stock passes as it is advanced. Numbers and sizes of microperforations can be adjusted by manipulation of laser control parameters, or by exchange of die cylinders. The laser can be a CO2 laser with between 10 W and 100 W output. The drills can be carbide drills. The label stock is typically 6-18 inches wide, and can
(Continued)

include an adhesive covered by a release sheet. The stock to be microperforated can include separate rows of labels or can be suitable for die-cutting after microperforation.

9 Claims, 9 Drawing Sheets

(51) Int. Cl.
*B31B 70/14* (2017.01)
*B23K 26/067* (2006.01)
(58) Field of Classification Search
USPC .......................................................... 53/52
See application file for complete search history.

(56) References Cited

U.S. PATENT DOCUMENTS

| | | | | |
|---|---|---|---|---|
| 4,281,670 A * | 8/1981 | Heitmann | ............... | A24C 5/606 131/281 |
| 4,923,542 A * | 5/1990 | Janicki | ................... | B60J 5/0416 156/249 |
| 5,055,653 A * | 10/1991 | Funami | ................ | B23K 26/067 219/121.75 |
| 5,382,773 A * | 1/1995 | Kurihara | ............ | B23K 26/0661 219/121.7 |
| 5,405,561 A * | 4/1995 | Dais | ......................... | B26D 9/00 156/204 |
| 5,684,617 A * | 11/1997 | Langhans | ............ | B23K 26/067 359/205.1 |
| 6,040,552 A * | 3/2000 | Jain | ...................... | B23K 26/067 219/121.7 |
| 6,207,925 B1 * | 3/2001 | Kendall | ................ | B23K 26/067 219/121.63 |
| 6,441,340 B1 * | 8/2002 | Varriano-Marston | ......................... | B65B 61/02 219/121.7 |
| 6,517,038 B1 * | 2/2003 | Pomerantz | ............. | B31D 1/021 248/214 |
| 6,596,359 B2 * | 7/2003 | Roth | ....................... | B31D 1/021 156/250 |
| 6,600,152 B2 * | 7/2003 | Paul | ................... | B23K 26/0643 250/234 |
| 6,689,985 B2 * | 2/2004 | Lipman | ................ | B23K 26/067 219/121.7 |
| 6,800,237 B1 * | 10/2004 | Yamamoto | ........... | B23K 26/389 264/400 |
| 7,083,837 B1 * | 8/2006 | Varriano-Marston | ......................... | B65B 61/02 428/34.1 |
| 7,094,193 B2 * | 8/2006 | Belcastro | ............... | A24C 5/007 131/281 |
| 7,215,454 B2 * | 5/2007 | Paul | ..................... | B23K 26/067 359/216.1 |
| 7,393,313 B2 * | 7/2008 | Belcastro | ............... | A24C 5/007 131/281 |
| 7,543,708 B2 * | 6/2009 | Doyle | ........................ | B65B 1/24 206/524.8 |
| 7,815,761 B2 * | 10/2010 | Phillips | ................. | B65C 9/1896 156/80 |
| 7,871,479 B2 * | 1/2011 | Garland | ................. | B31D 1/026 156/64 |
| 8,237,084 B2 * | 8/2012 | Varriano-Marston | ......................... | B65B 61/02 219/121.72 |
| 8,360,290 B2 * | 1/2013 | Flynn | ..................... | B26D 3/085 225/2 |
| 9,018,562 B2 * | 4/2015 | Dantus | ............... | B23K 26/0853 219/121.76 |
| 9,700,205 B2 * | 7/2017 | Yamazaki | .............. | A61B 3/117 |
| 2003/0039786 A1 * | 2/2003 | Milliorn | ................ | B31D 1/021 428/40.1 |
| 2008/0149604 A1 | 6/2008 | Varriano-Marston et al. | | |
| 2009/0052010 A1 * | 2/2009 | Michaud | .............. | B23K 26/705 359/315 |
| 2010/0230460 A1 * | 9/2010 | Flynn | ........................ | B26F 3/02 225/2 |
| 2013/0062242 A1 * | 3/2013 | De Heij | ............... | B23K 26/382 206/524.6 |
| 2013/0075439 A1 * | 3/2013 | Flynn | ........................ | B26F 3/02 225/1 |
| 2013/0102449 A1 * | 4/2013 | Graboski | ............. | B23K 26/382 493/340 |
| 2019/0224936 A1 * | 7/2019 | Varriano-Marston | ......................... | B23K 26/0846 |

OTHER PUBLICATIONS

Office Action for Canada Patent Appl. No. 3033375, dated Feb. 9, 2021, 4 Pages.
Intention to Grant for Europe Patent Appl. No. 17867107.9, dated Feb. 11, 2021, 32 Pages.
PCT Search Report and Written Opinion for Appl No. PCT/US2017/058091 dated Feb. 2, 2018, 14 pages.
International Preliminary Report on Patentability for Appl No. PCT/US2017/058091 dated May 7, 2019, 10 pages.

* cited by examiner

APPARATUS AND METHOD FOR PRODUCING MICROPERFORATED PATCHES AND LABELS APPLICABLE TO MODIFIED ATMOSPHERE PACKAGING

RELATED APPLICATIONS

This application is a national phase application of international application PCT/US17/58091 filed Oct. 24, 2017, which claims the benefit of U.S. Provisional Application No. 62/418,425, filed Nov. 7, 2016. Each of these applications is herein incorporated by reference in its entirety for all purposes.

FIELD OF THE INVENTION

The invention relates to fresh produce packaging, and more particularly to modified atmosphere packaging.

BACKGROUND OF THE INVENTION

Packaging is a necessary requirement for the transportation and distribution of goods. In the case of fresh produce packaging, special challenges arise because, unlike most dry or canned goods, fresh produce is biologically active, and undergoes continuous metabolic processes and changes while it is contained within a package. Accordingly, distribution of fresh produce to consumers is generally time sensitive, and methods for retarding the metabolic processes of packaged fresh produce so as to allow more time for transportation and distribution and for extended shelf life in the consumer's refrigerator can be highly valuable.

One such approach is cooling of freshly harvested produce using a method such as hydrocooling, forced air cooling, or vacuum cooling to remove the field heat before boxing and shipping. Maintaining the appropriate temperatures during storage, transportation and distribution, is also critical to slow the metabolic processes and to prolong freshness.

However, proper cooling and transportation temperatures can only go so far in extending the quality and shelf life of fresh produce. A complementary approach for slowing of fresh produce metabolic processes during shipment and transportation is through the use of modified atmosphere packaging. According to this approach, the concentrations of gases, especially oxygen and carbon dioxide, that surround the produce while it is contained in packaging are altered from their normal ambient values, causing a corresponding retardation in the metabolic rate of the fresh produce.

A modified atmosphere can be provided in any of several ways. For example, the fresh produce can be sealed in an essentially gas-impermeable "barrier" package, where the oxygen transmission rate (OTR) is <70 cc/m$^2$-day-atm, after subjecting the contents of the package to a modified atmosphere through the injection of gas mixtures before the package is sealed. This approach is relatively simple, and requires special equipment only at the point of packaging. However, continual respiration of the fresh produce in the barrier package after it is sealed will cause the internal gas percentages to shift over time, such that a desired optimum atmosphere cannot be maintained.

The present invention is directed to "equilibrium" modified atmosphere packaging ("MAP"), in which a desired internal atmosphere is maintained inside a fresh produce package without requiring special apparatus during packaging, shipment or distribution. According to this approach, the fresh produce packaging is configured to allow a limited and well-defined exchange of gasses with the surrounding ambient environment according to the type, condition (whole or cut) and weight of the fresh produce going into the package, and on the expected temperatures that the produce will encounter during storage, transportation and display. As the produce respires inside the sealed package, it consumes oxygen and generates carbon dioxide and water vapor, causing the concentrations of these gases to shift away from their ambient atmospheric values (20.9% $O_2$ and 0.3% $CO_2$). By controlling the gas exchange between the package and the surrounding environment, full depletion of the oxygen within the package is prevented, but the metabolic processes of the produce are slowed until the rate of oxygen consumption is in equilibrium with the rate at which the oxygen can be replenished through the limited permeability of the packaging.

The success of modified atmosphere packaging depends in large part on maintaining optimal gas concentrations within the packaging, where the optimal gas concentrations can vary significantly depending on the type and condition of fresh produce to be contained, as well as the size and other features of the packaging itself and the storage temperature. Accordingly, the gas permeability of MAP packaging must be precisely controlled, and it is advantageous to be able to easily adjust the permeability of the packaging to suit each type of fresh produce and package.

It should be noted that, for simplicity, references to modified atmosphere packaging, or "MAP," throughout the remainder of this document refer specifically to equilibrium modified atmosphere packaging, unless otherwise required by context.

There are several approaches that are used to impart a desired degree of gas permeability to fresh produce packaging. One approach is to use "low barrier," non-porous packaging materials (OTR=1085–7000 cc/m$^2$-day-atm) to package fresh produce. Unfortunately, low barrier materials only work for small weights of some salad items, and will not work for fresh produce like broccoli and sugar snap peas that have higher respiration rates. Furthermore, if the packages are subjected to temperature-abuse (as is often the case in retail stores), these low barrier materials do not have the required OTR to prevent the contents of the packages from going anaerobic, i.e., from reducing the internal package atmospheres to less than 1% $O_2$, and thereby causing unpleasant odors and/or flavors and potential microbiological safety issues.

Another approach is to construct part or all of a package from a microporous material that provides a well-defined gas permeability. Microporous materials can be created by including small filler particles, such as silica or calcium carbonate, in a polymer formulation, and orienting the film in the longitudinal and/or cross direction so as to create microscopic pores throughout the film. However, the methods by which microporous films are produced and the cost of the materials, as well as their opacity, limits their use in fresh produce packaging.

Also, since these microporous materials are opaque, making the entire package from microporous material can be unacceptable from a consumer standpoint, where great importance is given to the observation of the appearance of the fresh produce when making a selection. This problem can be mitigated by constructing only a portion of the packaging from microporous material, or by applying the microporous material only as a patch covering a small hole in the packaging, as described in more detail below with reference to FIGS. 3A and 3B.

Yet another approach is to microperforate the base material used to make the package. The microperforations can be made either mechanically, using pins or small drills, or by drilling micro-holes through the material using a laser. The microperforations can be uniformly distributed throughout the entire package, distributed throughout only a part of the package (such as the lid), or confined to one or only a very few "target areas." The choice of which approach to adopt depends at least partly on the type of packaging. Nevertheless, this approach provides the dual advantages of allowing selection from among a wide range of packaging materials and thicknesses, and precise control of the gas permeability by controlling the sizes and numbers of micro-perforations.

When microperforating packaging materials such as plastic films used to make bags or pouches, the microperforations are typically provided by direct perforation of the film as rollstock, rather than by providing microperforated patches. Similarly, when packaging is rigid or semi-rigid but includes a film cover, the film cover ("lidding film") is typically microperforated as rollstock before it is applied to the semi-rigid packaging. Microperforation of rollstock is advantageous, since the microperforation can be performed while the film is configured as a continuously moving web, before the microperforated material is made into bags or pouches, or slit into segments for making heat-sealable lids. This approach can be generally described as "moving" or "continuous" microperforation. An example is illustrated in FIG. 1. Typically, in this approach a laser head 210 is fixed in position and is activated to drill the microperforations 100 in a single column 50 as the web 40 passes continuously at high speed beneath it. FIG. 1 is described in more detail in U.S. Pat. Nos. 6,441,340 and 7,083,837, also by the inventor of the present invention, which are incorporated herein in their entirety for all purposes.

The approach of FIG. 1 works well for flexible packaging materials, but is more difficult to implement when the packer wants to enclose their fresh produce in an entirely semi-rigid or rigid container, e.g., a tray with a rigid or semi-rigid lid. When a package is entirely rigid or semi-rigid, either of two approaches is typically adopted. With reference to FIG. 2, one approach is to form microperforations 100 directly in the rigid or semi-rigid material 220. Typically, this requires that each package be moved very slowly down a conveyor during microperforation, as shown in FIG. 2, or be stopped while the microperforations are made. This approach is generally referred to herein as "stopped" microperforation. FIG. 2 is also described in more detail in U.S. Pat. No. 8,237,084, also by the present inventor, and also incorporated by reference herein in its entirety for all purposes.

With reference to FIGS. 3A and 3B, the other approach that can be used for implementing MAP when using rigid or semi-rigid packaging, which is also applicable to flexible packaging, is to provide at least one small but macroscopic opening 300 (typically ranging in size from 0.5 in$^2$ to 3 in$^2$) in the package 302 or lid 304, and then to cover the macroscopic opening 300 with a flexible, microporous label or patch 306 that is affixed to the packaging, for example by heat-sealing the flexible patch onto the packaging or applying it using a pressure sensitive adhesive coated on the back of the microporous patch.

Unfortunately, approaches such as FIGS. 3A and 3B that depend on a patch made from a microporous material do not enable wide variations in the control of permeability, since the permeability can only be adjusted by varying the amount of filler and the degree of stretching of the film during production of the microporous material, by changing the size of the macroscopic hole to which the patch is applied, and/or by applying a coating to the microporous patch to reduce the permeability of the patch by desired amounts. All such operations increase the cost of the resulting packaging and limit the market value of this technology. And in all cases, adjustment of the gas permeability of the package, for example to accommodate different types of fresh produce, requires significant changes to a production line, and cannot be made flexibly or on an as-needed basis.

In this regard, the laser perforation methods of FIGS. 1 and 2 are superior, because adjustments to the laser power and pulse duration can be easily implemented by software to adjust the gas permeability of a package. However, as discussed above, continuous laser perforation (FIG. 1) generally produces only a single column of perforations, and as such is not appropriate for perforation of patches or labels, which are generally provided on a narrow web in a plurality of columns. Stopped laser perforation on the other hand (FIG. 2) reduces production speed and increases cost.

What is needed, therefore, is a method for producing MAP labels or patches with defined O2 flux rates that reduces production cost and provides easy and precise adjustment of gas permeability.

SUMMARY OF THE INVENTION

A method for producing microperforated patches with defined O2 flux rates for use in MAP packaging is disclosed that reduces production costs and provides easy and precise adjustment of the gas permeability by varying the number and sizes of microperforations. The method is applicable for microperforating patches or labels arranged in a plurality of columns on a web. In embodiments, the method is applicable to patches produced using standard label stock intended for processing on conventional label making presses, which are narrow web presses (web widths of 6" to 18").

The label stock used in embodiments of the invention is typically between six inches and fifteen inches wide, i.e. suitable for use with a narrow-web printing press typically used by label manufactures, and either includes pre-cut labels arranged in rows and columns, or is intended for subsequent die cutting into rows and columns according to the desired label sizes. In some embodiments, the label stock is an inexpensive material having an OTR ranging from 70 to 1000 cc O2/m2-day-atm, such as polyester or polypropylene, both of which have a CO2/O2 permeability ratio of 1. In other embodiments, the $CO_2$ permeability of the label stock is higher than the $O_2$ permeability, i.e. the $CO_2/O_2$ permeability ratio is greater than one. Examples of such materials include non-wovens incorporating cross-linked poly(dimethyl siloxane). These higher CO2/O2 ratio base materials have the advantage of slowing the metabolism of the fresh produce due to the limited oxygen supply, while at the same time limiting the build-up of $CO_2$ within the package.

Typically, but not always, an adhesive is pre-applied to the label stock and is protected by a release sheet made from polyester or another suitable material coated with a silicone release agent that aids in the ease of label dispensing with automatic label dispensers. The adhesive can be applied to the entire underside of the label stock, or the adhesive can be applied only around the periphery of each label, leaving the centermost portion free of adhesive. In embodiments, the labels are polyolefin-based printable materials and the adhesive is a pressure sensitive adhesive ("PSA").

In one general aspect of the present invention, one or more lasers are used to drill a desired number of microperforations in each of the patches (i.e. the labels) as the label stock moves through the apparatus. This general aspect of the invention is, in some sense, an extension of the "continuous" laser method of FIG. 1, in that the micro-perforations are drilled as the label stock is in motion. Unlike FIG. 1, however, according to this approach holes are drilled in a two-dimensional array pattern, so as to produce at least one microperforation in each label of each row.

In some embodiments where a beam from a single laser is used, the laser head is not static, but is moved transversely across the width of the label stock by a translational positioner as the web advances. In other embodiments, rotatable mirrors such as in a galvanometer-based scanning head are used to shift the laser beam across the rows of labels. In still other embodiments, beam-splitters are used to apply the laser beam simultaneously to more than one location across each row of labels.

In various embodiments, a plurality of laser beam delivery heads are positioned in a horizontal row across the web of labels. In some of these embodiments each laser head drills one or more microperforations in each row of labels as directed by a laser controller. In other embodiments head-translating and/or laser beam shifting apparatus is used to produce one or more microperforations in each row of labels.

According to these embodiments, the number, placement, and sizes of the perforations in each label are controlled simply by firmware or software control of the laser(s) and of the associated laser head(s) and/or beam positioning equipment. Unlike traditional approaches such as FIG. 1 that are applied to film in a web moving past the laser at high speed, this new approach can be readily applied to label stock because the narrower width of the stock and the slower speed (usually less than 120 ft/min) at which typical label presses operate enables the plurality of holes to be drilled in each row without stopping the web.

Embodiments of this general aspect use at least one $CO_2$ laser with an output power of between 10 W and 100 W. This compares with laser outputs of 100 W to 400 W for typical implementations of the method of FIG. 1. These lower power levels can be used because the slower motion of the label stock allows the drilling time for each hole to be increased. As a result, the lasers used in this approach tend to be smaller and lighter than the lasers used in the approach of FIG. 1, which facilitates the movement of the laser head by a translational positioner and/or location of more than one fixed laser head above a row of labels.

Typically, the applied adhesive in these embodiments covers the entire label, and is sufficiently thin to be burned away by the laser so as to avoid occlusion of the microperforations. Microperforation occlusion can be avoided by appropriate adjustment of the laser power and pulse duration as well as appropriate selection of adhesive used in the labelstock.

In a second general aspect of the invention, microperforations are mechanically punched through the labels as they pass through the apparatus by carbide drills or pins, or by some other mechanical hole-punching feature (referred to herein generically as "drills") mounted onto a rotating die cylinder. In embodiments, the microperforations are approximately 100 microns in diameter. In some of these embodiments, the die can be heated by an applied heat source. In various embodiments, air or another gas is applied to the reverse side of the label stock so as to remove material that is punched out of the microperforations. In some embodiments the stock is passed over a pad, or between pads, so as to wipe such materials away from the stock.

In certain embodiments where the label material is continuous on the roll and is die-cut into labels, the drills are included in the die cutting cylinder, so that the microperforation and die-cutting take place in a single step. In other embodiments, the drills are mounted on a separate microperforating die cylinder. In various embodiments, a pair of cylinders is provided on opposing sides of the label web in a male/female relationship, with the "female" cylinder having indentations into which the drills from the "male" die cylinder enter as they pass through the labels, in a manner that is similar to operations used for embossing polymer materials.

According to this general aspect, the numbers and/or sizes of the microperforations, and hence the gas permeability of the patches (i.e. the labels), can be varied simply by exchanging the microperforating die cylinder in the apparatus.

One general aspect of the present application is a system for producing breathable patches or labels suitable for application to packaging materials for modified atmosphere packaging of fresh produce. The system includes a web comprising patch material, a web advancing system configured for continuous advancement of the web in a longitudinal direction across a web processing region, a laser, and a controller configured to activate the laser and to control application to the web of a laser beam from the a laser as the web is advanced in the longitudinal direction so as to drill microperforations in a plurality of locations distributed across the web in a transverse direction that is approximately perpendicular to the longitudinal direction, thereby drilling a plurality of transversely separated longitudinal columns of microperforations in the web of patch material.

A second general aspect of the present invention is a method for microperforating patches suitable for application to packaging materials. The method includes advancing a web comprising non-porous patch material continuously in a longitudinal direction across a web processing region. As the web is continuously advancing, at least one laser beam is caused to drill microperforations in a plurality of locations that are distributed across the web in a transverse direction that is approximately perpendicular to the longitudinal direction, thereby drilling a plurality of transversely separated longitudinal columns of microperforations in the web of patch material.

In embodiments of either general aspect, a plurality of laser heads arranged in a transverse row are positioned above the web of patch material.

In any of the above embodiments, at least one laser head can be moved in the transverse direction by a translational positioner.

In any of the above embodiments, a rotatable mirror can be used to cause a laser beam to create microperforations in a plurality of the locations.

In any of the above embodiments, a beam splitter can be used to cause a laser beam to drill microperforations simultaneously in a plurality of the locations.

In any of the above embodiments, the laser can be a CO2 laser.

In any of the above embodiments, the laser can have a maximum output power of between 10 W and 100 W.

A third general aspect of the present invention is a system for producing patches suitable for application to packaging materials for modified atmosphere packaging of fresh produce. The system includes a web comprising patch material, a web advancing system configured for continuous advancement of the web in a longitudinal direction across a web processing region, a die cylinder oriented perpendicular to the longitudinal direction and positioned in the web processing region so that the web passes across the cylinder and the cylinder rotates at a corresponding rate, and a plurality of drills mounted in the die cylinder and positioned so as to punch microperforations through the patch material in a plurality of transversely separated longitudinal columns.

A fourth general aspect of the present invention is a method for microperforating patches suitable for application to packaging materials. The method includes advancing a web comprising patch material continuously in a longitudinal direction across a web processing regions as the web is continuously advancing, causing the web to pass across a die cylinder oriented perpendicular to the longitudinal direction, and causing the die cylinder to rotate at a corresponding rate as the web passes over it, so that a plurality of drills mounted in the die cylinder punch microperforations through the patch material in a plurality of transversely separated longitudinal columns.

In any of the third or fourth aspects, the drills can be carbide drills.

In any above embodiment of the third and fourth aspects, the microperforations can be approximately 100 microns in diameter.

In any of the above embodiments, the patch material can be die-cut into a plurality of patches arranged in transverse rows and longitudinal columns.

In any above embodiment of the third and fourth aspects, the web can include a contiguous sheet of the patch material and the die cylinder can be configured to cut individual labels from the patch material in addition to punching the microperforations through the patch material, or in any embodiment of the third and fourth aspects, the web can include a contiguous sheet of the patch material, and the system or method can further include a label cutting cylinder configured to cut individual labels from the patch material, the label cutting cylinder being distinct from the die cylinder.

In any above embodiment of the third and fourth aspects, the embodiment can further include a receptor cylinder, wherein the die cylinder and receptor cylinder are arranged on opposing sides of the web in a male/female relationship, such that the drills of the die cylinder are inserted into receptacles in the receptor cylinder as they penetrate the web.

In any preceding embodiment, the web can be between six inches and 18 inches in width.

In any preceding embodiment, the web can include a contiguous sheet of the patch material.

In any preceding embodiment, the web can include an adhesive applied to an underside of the patch material and protected by a release sheet. In some of these embodiments, the adhesive covers the entire underside of the patch material. In other of these embodiments, the adhesive is applied in a pattern configured to cover only a periphery of an underside of each of a plurality of patches derived from the patch material. In still other of these embodiments, the web further includes an adhesive deadener applied in a pattern configured to cover only central regions of the underside of each of a plurality of patches derived from the patch material, so that only adhesive applied to a periphery of the underside of each of a plurality of patches retains its adhesive properties. In any of these embodiments, the adhesive can be a pressure sensitive adhesive.

In any preceding embodiment, the web can be label stock.

And in any preceding embodiment, the patch material ca be a polyolefin-based printable material.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a method for producing microperforated labels or patches with defined O2 flux rates for use in MAP packaging that reduces production costs and provides easy and precise control of the number and sizes of microperforations. The method is applicable for microperforating patches or labels arranged in a plurality of columns on a web. In embodiments, the method is applicable to patches provided on standard label stock intended for processing on conventional label presses, which are narrow web presses (web widths of 6" to 18").

Figure 4:
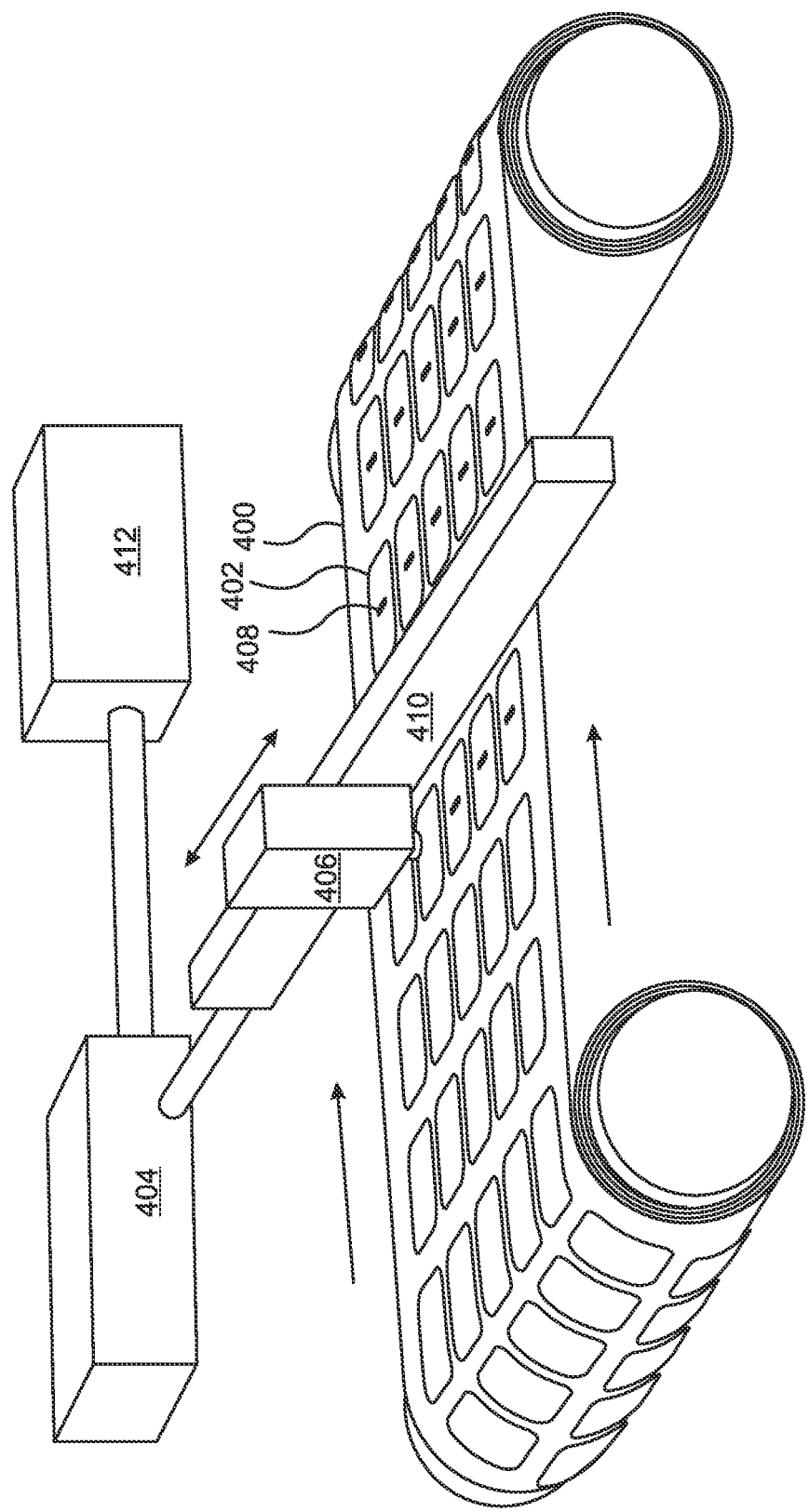
FIG. 4 is a perspective view of an embodiment in a first general aspect of the present invention, in which microperforations are drilled through patch material by a laser mounted above the patch material on a translational positioner.

With reference to FIG. 4, the label stock 400 used in embodiments of the invention is typically between six inches and fifteen inches wide, i.e. suitable for use with narrow-web printing presses as are typically used by label manufactures, and either includes pre-cut labels 402 arranged in rows and columns, or is intended for subsequent die-cutting into rows and columns according to the desired label sizes after the microperforations are added to the material.

In some embodiments, the label stock 400 is an inexpensive non-porous polyolefin material having an OTR ranging from 70 to 1000 cc O2/m2-day-atm, such as polyester or polypropylene, both of which have a CO2/O2 permeability ratio of 1. In other embodiments, the $CO_2$ permeability of the label stock 400 is higher than the $O_2$ permeability, i.e. the $CO_2/O/_2$ permeability ratio is greater than one. Examples of such materials include various nonwoven materials incorporating cross-linked poly(dimethyl siloxane). This approach has the advantage of slowing the metabolism of the fresh produce due to the limited oxygen supply, while at the same time limiting the build-up of $CO_2$ within the package.

Typically, but not always, an adhesive is pre-applied to the label stock 400 and is protected by a silicon release sheet (not shown) made from polyester or another suitable material coated with a silicone release agent that aids in the ease of label dispensing with automatic label dispensers. The adhesive can be applied to the entire underside of the label stock 400, or the adhesive can be applied only around the periphery of each label 402, leaving the centermost portion free of adhesive. In still other embodiments, a special coating is applied to the underside of each label 402 in the label stock 400 that "deadens" the adhesive in the center of the label 402 and allows the adhesive to remain tacky only at the periphery of the label 402. In embodiments, the labels 402 are polyolefin-based printable materials, and the adhesive is a pressure sensitive adhesive ("PSA").

In one general aspect of the present invention, one or more lasers are used to drill a desired number of microperforations in each of the patches (i.e. the labels) as the label stock moves through the apparatus. The holes are drilled in a two-dimensional array pattern, so as to produce at least one microperforation in each label of each row.

In the embodiment of FIG. 4, a single laser comprising a power supply 404 and a laser head 406 is used to drill a desired number of microperforations 408 in the patches (i.e. the labels) 402 as the label stock 400 moves through the apparatus. In this embodiment, the laser head 406 is not static, but is moved transversely across the width of the label stock 400 by a translational positioner 410 controlled by a controller 412, as the label stock advances, so as to drill microperforations 408 in each of the plurality of labels 402 in each "row" of the label stock 400. The number, placement, and sizes of the perforations 408 in each label 402 are controlled simply by firmware and software control of the laser 404, laser head 406, and translational positioner 410. Unlike traditional approaches such as FIG. 1 that are applied to film in a web moving at high speed past the laser, this new approach, whereby both the label stock and the laser head are simultaneously in motion can be readily implemented because of the narrower width of the stock and the slower speeds at which typical label presses operate.

Figure 5:
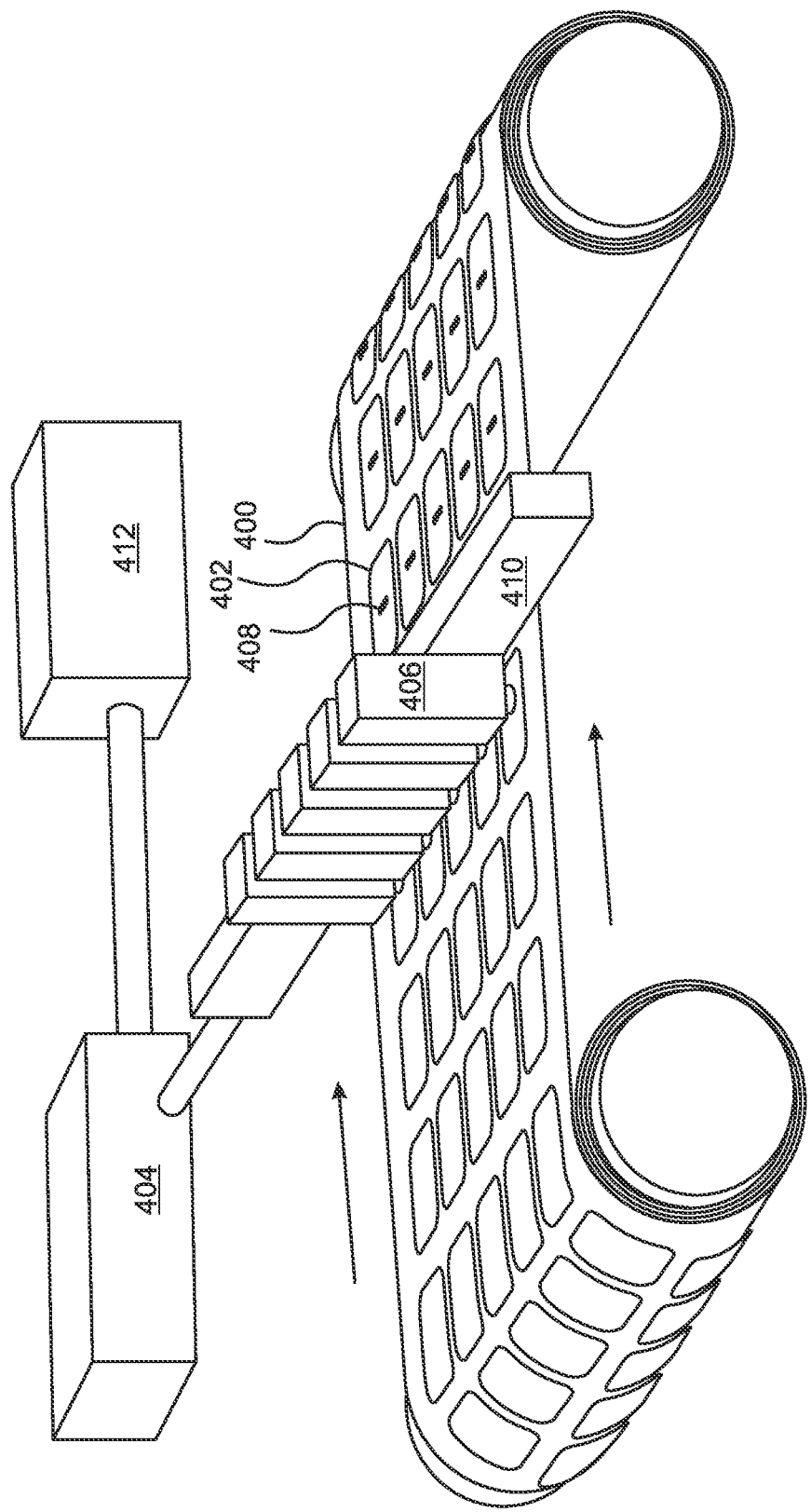
FIG. 5 is a perspective view of another embodiment in the first general aspect of the present invention, in which microperforations are drilled through the patch material by a plurality of fixed laser delivery heads mounted above the patch material.

FIG. 5 illustrates a similar embodiment, in which a plurality of low-power lasers 408 (for example 10 W lasers) are positioned laterally across the web so as to drill microperforations simultaneously as the web passes under them. In some embodiments, each laser is static, and drills single microperforations, or multiple microperforations in a single column, into each label, as determined by hardware or software programs, in predetermined portions of the label as the web passes by. In other embodiments the laser heads are shifted by a translational positioner 410 so as to each burn a lateral row or even a two dimensional pattern of microperforations in each label as it passes.

Figure 6:
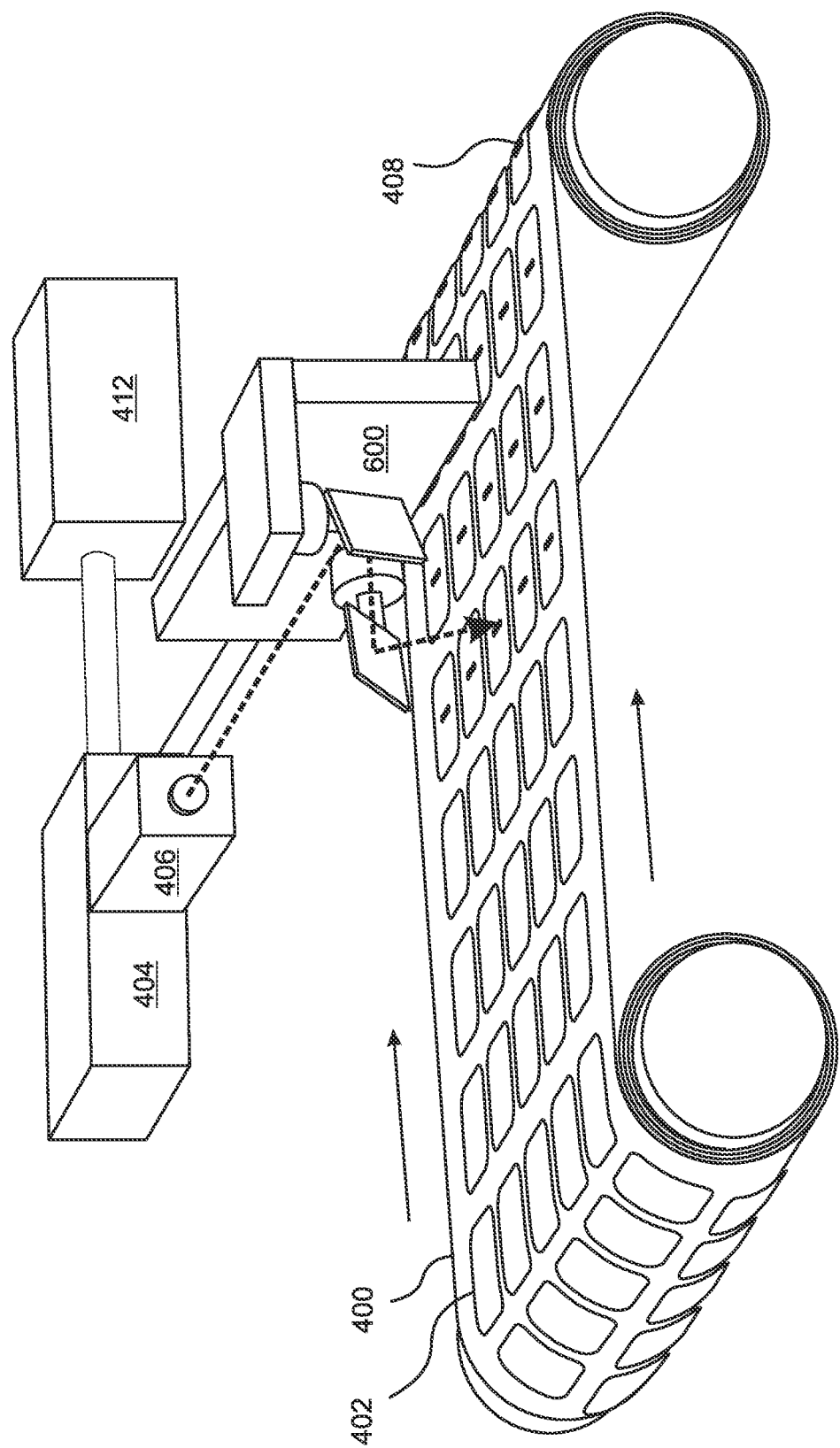
FIG. 6 is a perspective view of yet another embodiment in the first general aspect of the present invention, in which microperforations are drilled through the patch material by a laser beam that is translated across the patch material by a scanning galvanometer.

FIG. 6 illustrates an embodiment in which the beam from a single, stationary laser 406 is deflected by a series of mirrors using a servo-controlled scanning galvanometer 600 so as to drill a plurality of microperforations as the label web passes beneath.

Figure 7:
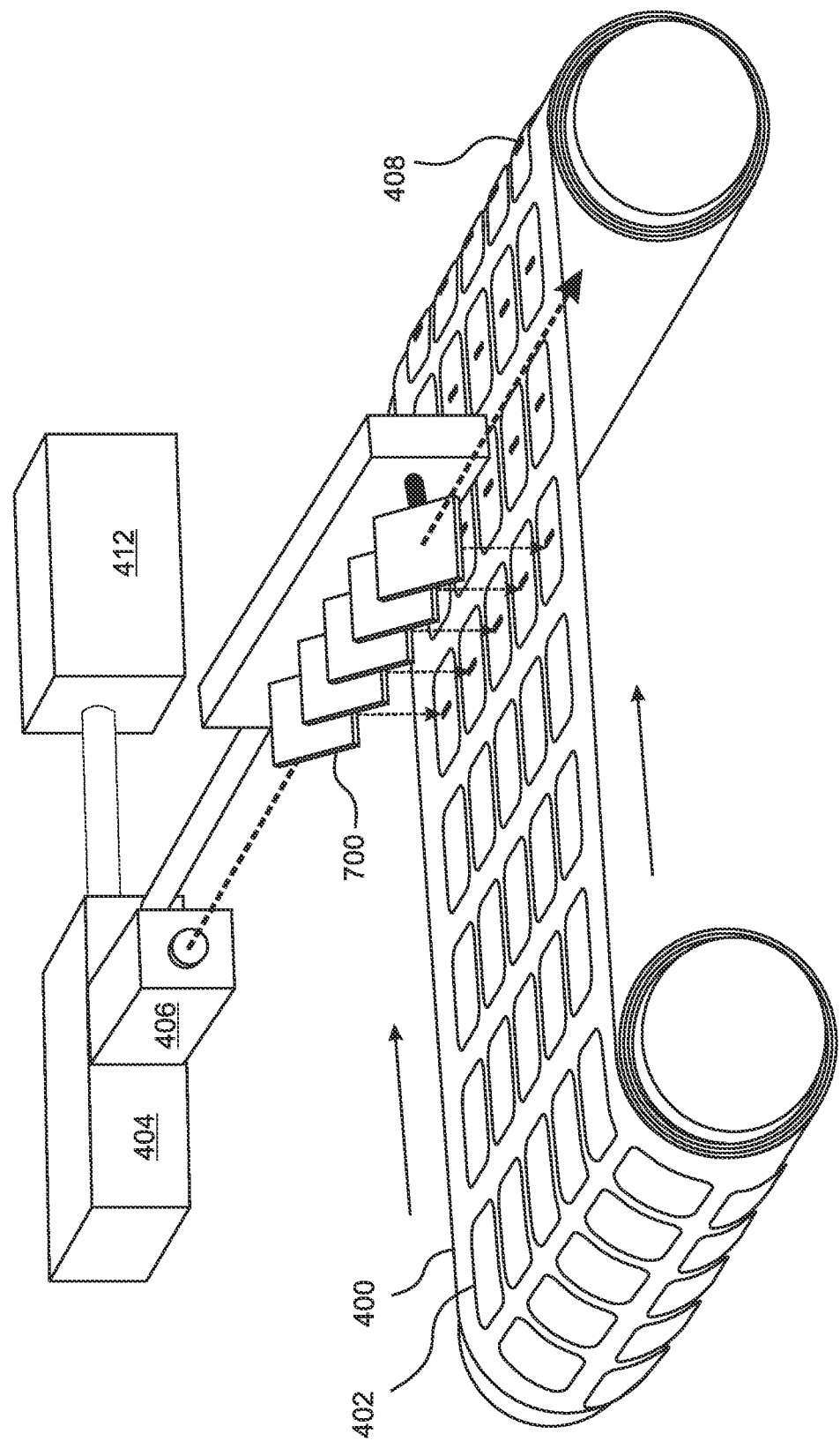
FIG. 7 is a perspective view of still another embodiment in the first general aspect of the present invention, in which microperforations are drilled through the patch material by a laser beam that is reflected onto the patch material by a plurality of beam splitters mounted above the patch material.

Yet another approach is illustrated in FIG. 7, wherein one or more beam splitters 700 are used to divide a single, relatively high power laser beam into a plurality of beams that simultaneously drill one or more holes in each of the labels in each row. The beam splitters can be rotated or fixed, and each beam splitter can split its input beam into two or more than two outputs, depending on the embodiment. Note that, for clarity of illustration, the laser beam is shown to emerge from the final beam splitter 700. In similar embodiments, the row of beam splitters 700 is terminated by a mirror, so that all of the laser energy is directed to the labels.

Embodiments of this general aspect use a $CO_2$ laser with an output power of between 10 W and 100 W. This is in contrast to laser outputs of 100 W to 400 W for typical implementations in fast moving webs, such as the example shown in FIG. 1. The lower power levels of this general aspect can be used because the slower motion of the label stock 400 allows the drilling time for each hole 408 to be extended. As a result, the laser heads 406 used in this approach tend to be smaller and lighter than the laser heads 210 used in the approach of FIG. 1, which facilitates the mounting of a plurality of fixed heads 406 above the labels, movement of the laser head(s) by a translational positioner 410, or the use of a fixed, servo-driven galvanometer to move a single laser beam across a row of labels.

Figure 9:
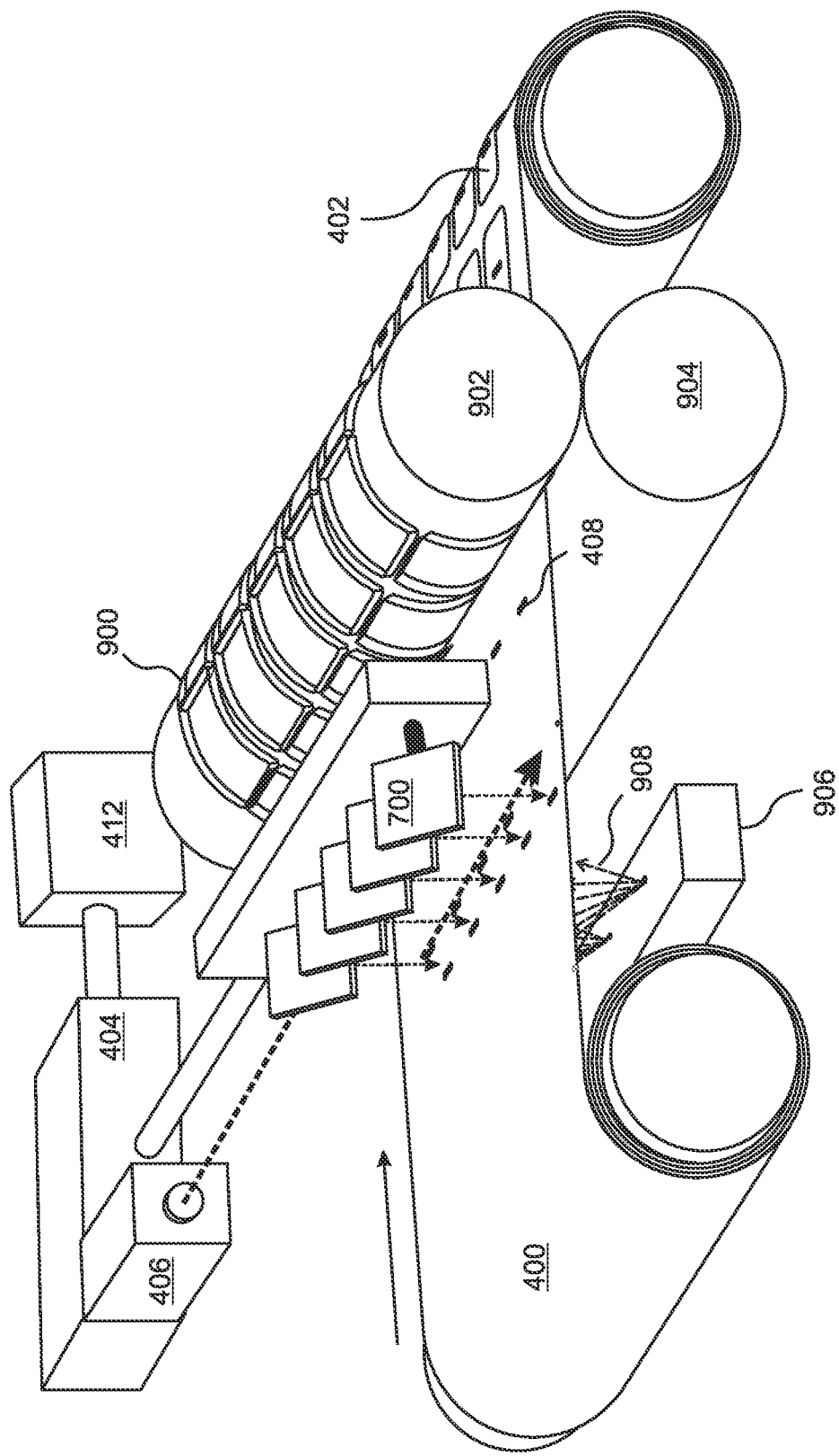
FIG. 9 is a perspective view of an embodiment similar to the embodiment of FIG. 7, but further including die-cut cylinders that cut the web into patches after they are microperforated, and an adhesive sprayer that sprays an adhesive onto the underside of the web.

FIG. 9 is a perspective view of an embodiment similar to the embodiment of FIG. 7, but further including die-cut cylinders 902, 904 that cut the web 400 into patches 402 after they are microperforated 408, as well as an adhesive sprayer 906 that sprays an adhesive 908 onto the underside of the web 400. Cutting cylinder 902 is positioned above the web 400, and includes die cutting blades 900 configured to press against a receiving cylinder 904 positioned below the web, thereby cutting through the web material 400 as it passes between the cylinders 902, 904.

Figure 1:
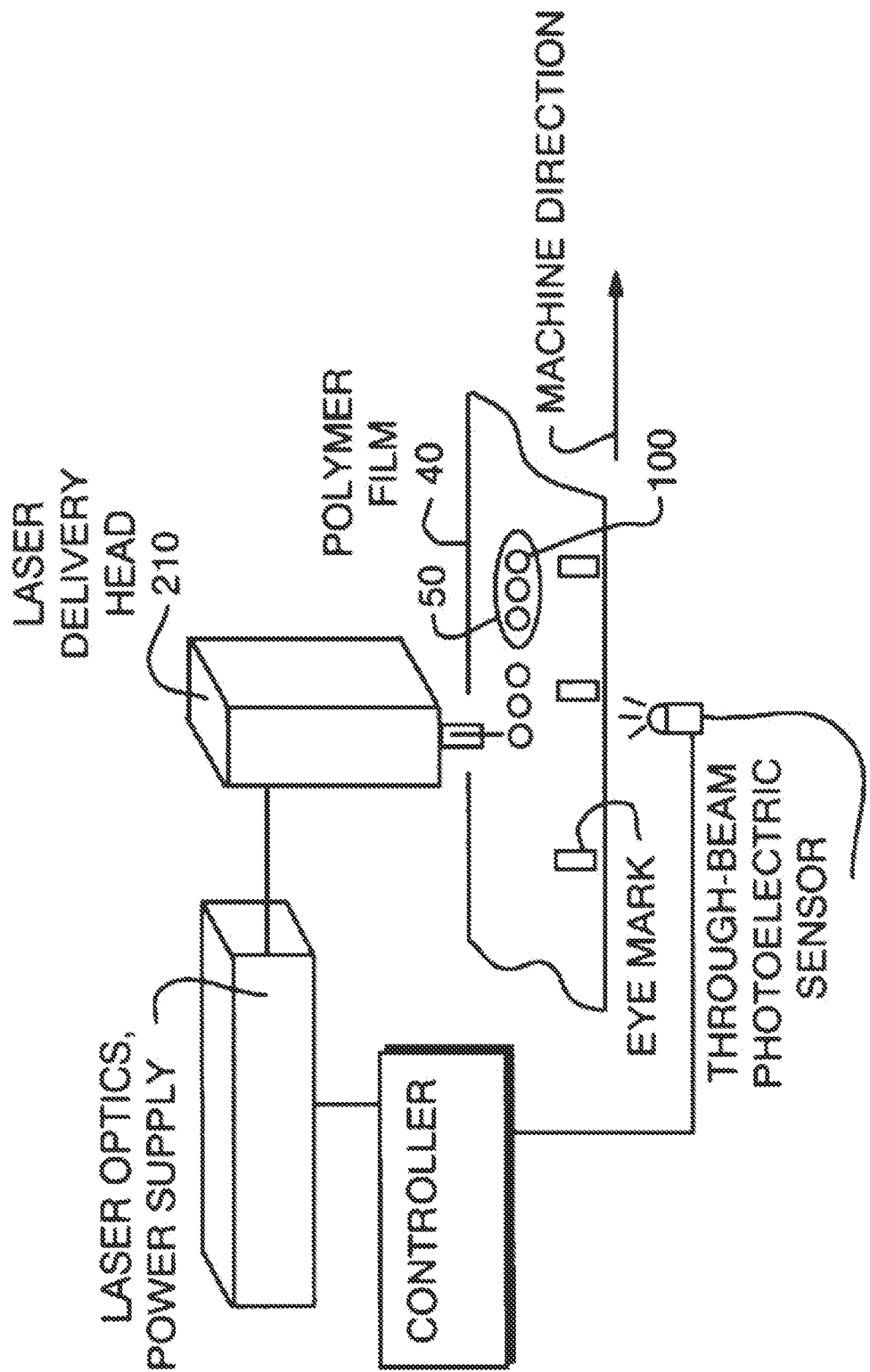
FIG. 1 is a perspective view of a continuous film microperforation system of the prior art.
Figure 2:
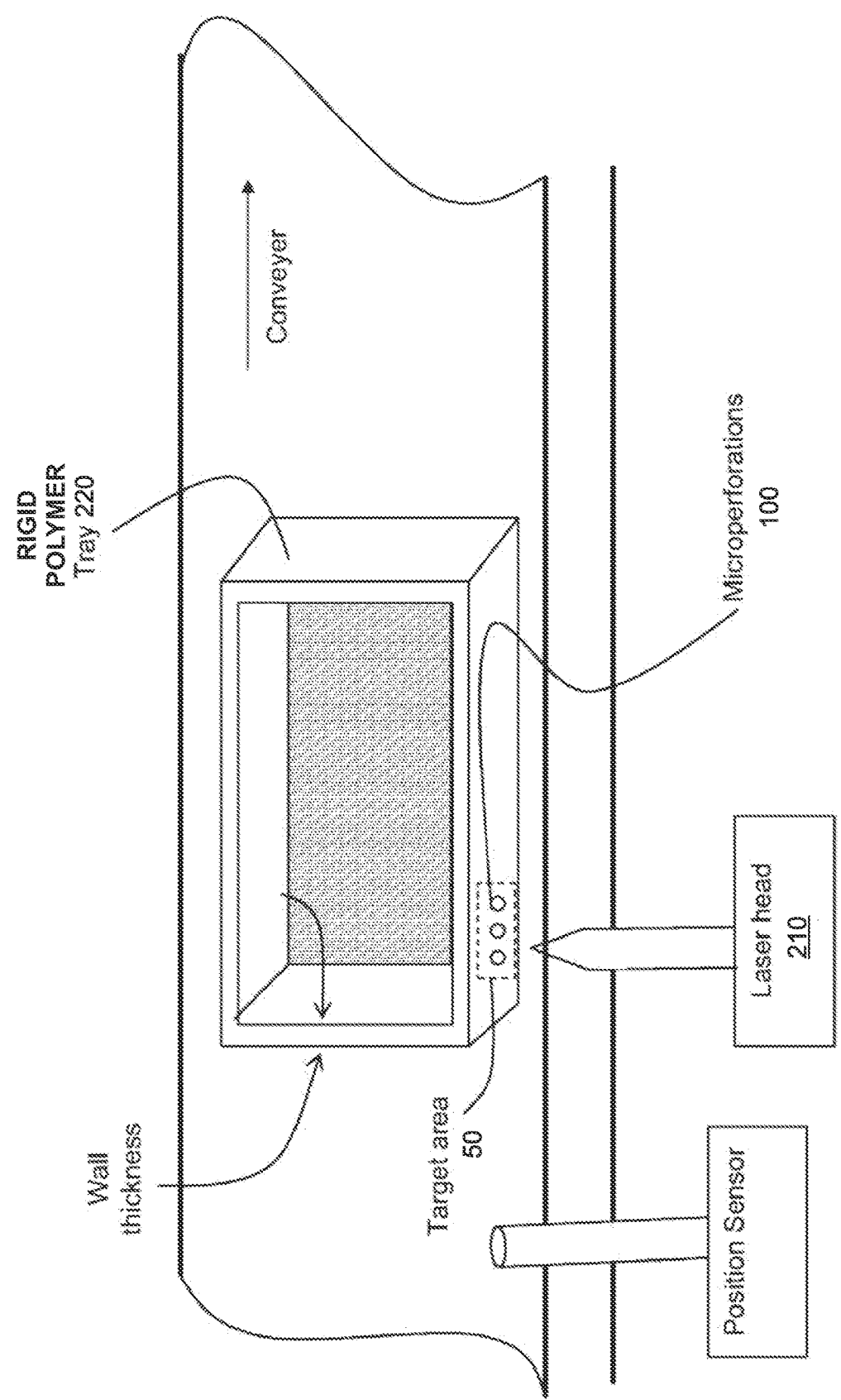
FIG. 2 is a perspective view of a stopped rigid polymer microperforation system of the prior art.
Figure 3A:
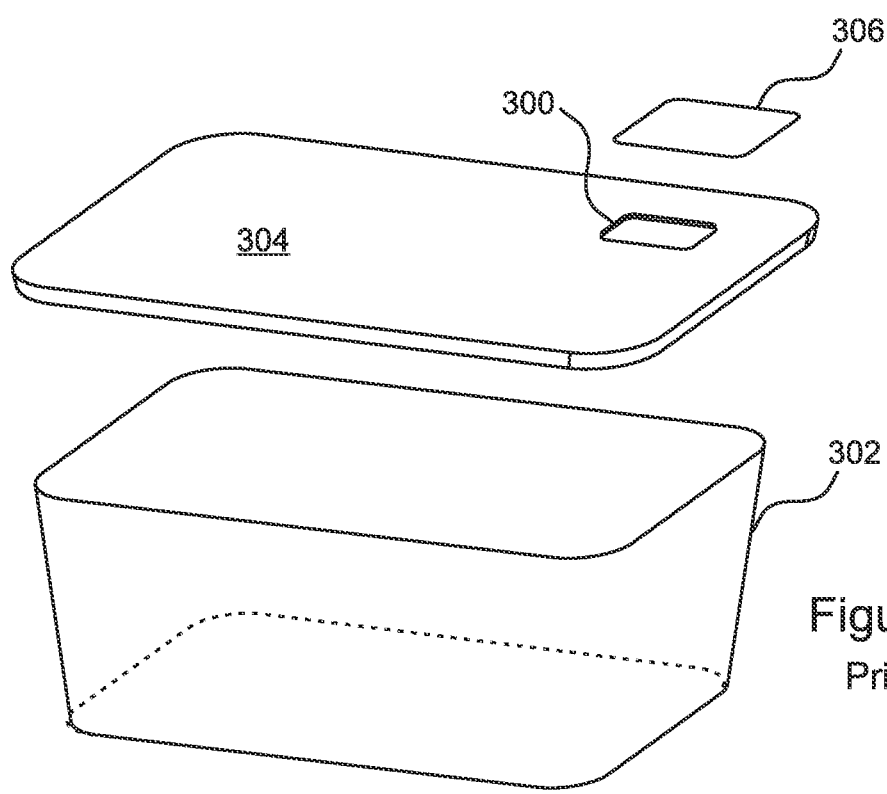
FIG. 3A is an exploded view of a container and lid incorporating a MAP patch of the prior art.
Figure 3B:
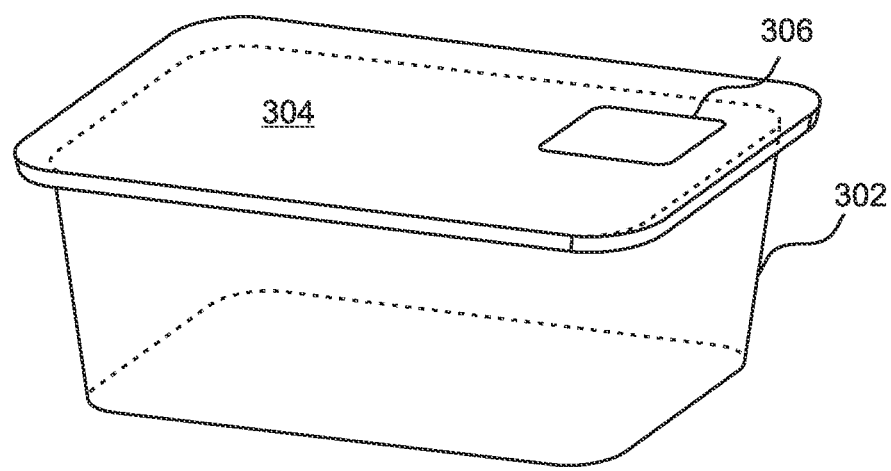
FIG. 3B is a perspective view of the assembled container, lid, and MAP patch of FIG. 3A.

Movement of the laser head(s) 406 in embodiments across the label web is further facilitated by the narrow width of the web, which is typically between six inches and fifteen eighteen inches, as compared to widths on the order of 54-60 inches that are typically encountered when using the method illustrated in FIG. 1 to microperforate films on slitter/rewinder machines at plastic converters or collapsed blown plastic tubing on bag-making machines used by polymer film manufacturers.

Typically, the applied adhesive 908 in this first general aspect covers the entire rear surface of the label 402, and will not occlude the drilled holes 408 because the adhesive 908 is ablated during the laser drilling process. Occlusion can be avoided by appropriate adjustment of the laser power and pulse duration, and/or by proper selection of the adhesive type and thickness applied to the labelstock 400 that is used for making the microperforated labels 402. As an alternative, a patterned adhesive can be applied only to the periphery of plain polyolefin film that does not have an adhesive backing, thereby leaving the center of the label free of adhesive and eliminating concerns about adhesive occlusion of the laser-drilled holes. In still other embodiments, a fully adhesive-coated labelstock 400 is used, and the adhesive in the centermost portion of each label 400 is "deadened" using a special coating and a printing plate, so that only the periphery of each finished label 402 is tacky.

Figure 8:
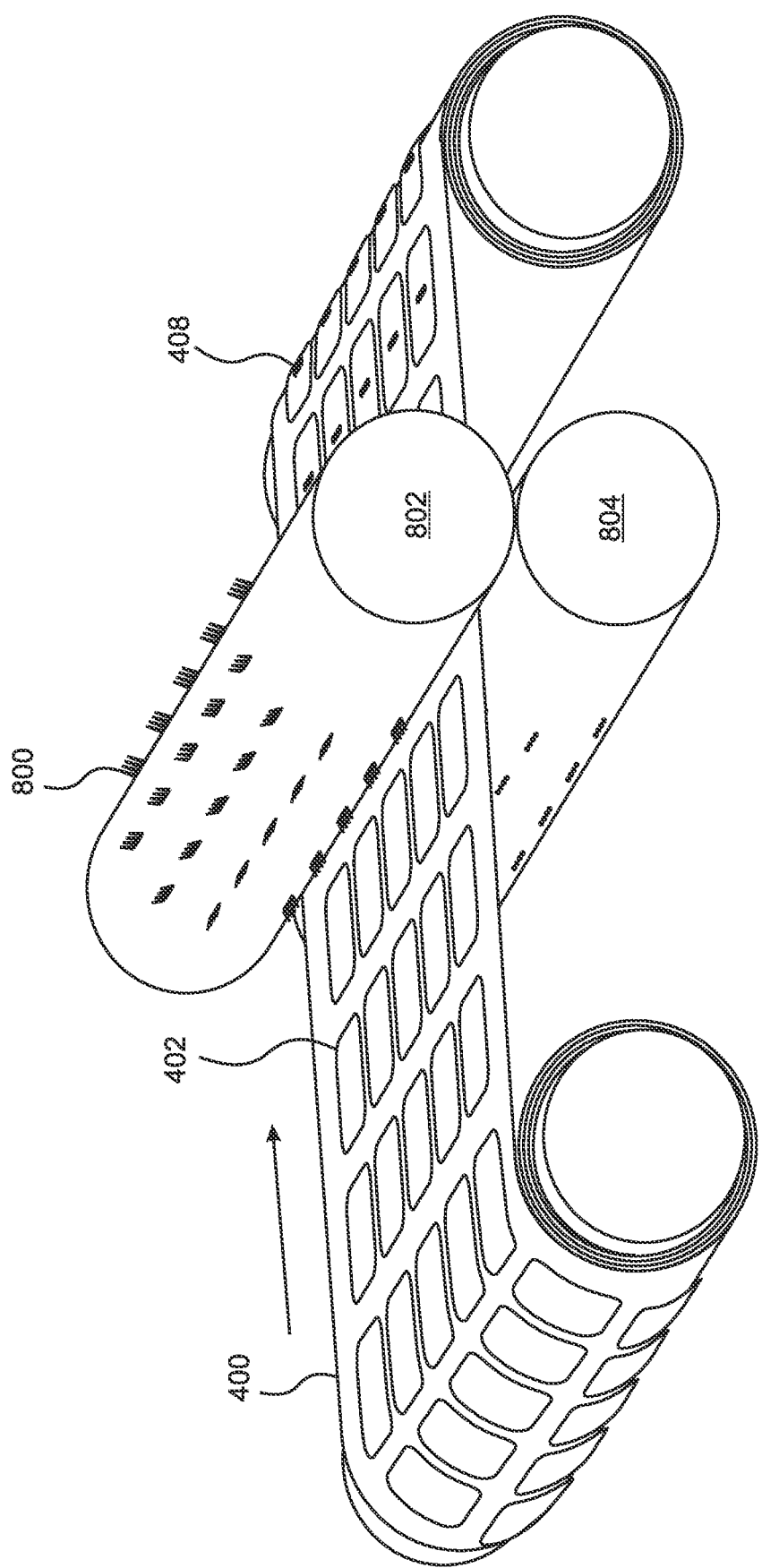
FIG. 8 is a perspective view of a second general aspect of the present invention, in which microperforations are punched through patch material by drills mounted into a die cylinder.

With reference to FIG. 8, in a second general aspect of the invention the microperforations 408 are mechanically punched through the labels 402 as they pass through the apparatus by carbide drills, pins, or some other mechanical hole-punching feature (referred to herein generically as "drills") 800 mounted into a rotating die cylinder 802. In embodiments, the microperforations 408 are approximately 100 microns in diameter. In some of these embodiments, the die cylinder 802 can be heated by an applied heat source. As an alternative, label stock having adhesive applied in a pattern only on the peripheries of the labels can be mechanically drilled without any concerns for adhesive occlusion of the mechanical holes.

In various embodiments, air or another gas is applied to the reverse side of the label stock 400 so as to remove material that is punched out of the microperforations 408. In some embodiments the stock 400 is passed over a pad, or between pads, so as to wipe such materials away from the stock. In certain embodiments where the label material 400 is continuous on the roll and is die-cut into labels, the drills 800 are included in the die cylinder that cuts the labels, so that the microperforation and die-cutting take place in a single step. In other embodiments the drills are provided on a separate microperforating die cylinder. In various embodiments, a pair of cylinders 802, 804 is provided on opposing sides of the label web in a male/female relationship, with the "female" 804 cylinder having indentations into which the drills 800 from the "male" 802 die cylinder enter as they pass through the labels, in a manner that is similar to operations used for embossing polymer materials.

According to this general aspect, the numbers and/or sizes of the microperforations 408, and hence the gas permeability of the patches (i.e. the labels) 402, can be varied simply by exchanging the microperforating die cylinder in the apparatus.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

The invention illustratively disclosed herein suitably may be practiced in the absence of any element which is not specifically disclosed herein and is not inherently necessary. However, this specification is not intended to be exhaustive. Although the present application is shown in a limited number of forms, the scope of the invention is not limited to just these forms, but is amenable to various changes and modifications without departing from the spirit thereof. One of ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

I claim:

1. A system for producing breathable patches or labels suitable for application to packaging materials for modified atmosphere packaging of fresh produce, the system comprising:
a web comprising patch material, wherein the patch material is either pre-cut or is suitable for cutting into a plurality of patches;
a web advancing system configured for continuous advancement of the web in an advancement direction of the web across a web processing region;
at least one laser; and
a controller configured to activate the at least one laser and to control application to the web of at least one laser beam from the at least one laser as the web is advanced in the advancement direction so as to drill microperforations in a plurality of locations distributed across the web in a transverse direction that is approximately perpendicular to the advancement direction, thereby drilling a plurality of separated rows and/or columns of microperforations in the web of patch material;
wherein the system further comprises a plurality of beam splitters configured to be impacted simultaneously by one of the laser beams, each of the beam splitters being configured to direct a drilling portion of the laser beam onto the web, while allowing a transmitted portion of the laser beam to continue beyond the beam splitter; and
wherein at least one of the beam splitters is rotatable, and is configured to direct the drilling portion of the laser beam onto the web in a variable direction.

2. The system of claim 1, further comprising a rotatable mirror configured to cause at least one of the laser beams to create microperforations in a plurality of the locations.

3. The system of claim 2, wherein the rotatable mirror is included in a galvanometer-based scanning head.

4. The system of claim 1, wherein the at least one laser includes at least one $CO_2$ laser.

5. The system of claim 1, wherein the at least one laser includes a laser that has a maximum output power of between 10 W and 100 W.

6. The system of claim 1, wherein the patch material is pre-cut into a plurality of patches arranged in columns in the advancement direction of the web and in rows that are transverse to the columns.

7. The system of claim 1, wherein the web comprises a continuous sheet of the patch material and the system further comprises a label cutting cylinder configured to cut individual labels from the patch material.

8. The system of claim 1, wherein the web comprises a continuous sheet of the patch material.

9. The system of claim 1, wherein the web includes an adhesive applied to the entire underside of the patch material and protected by a release sheet.

* * * * *